US008103063B2

(12) United States Patent
Hillhouse

(10) Patent No.: US 8,103,063 B2
(45) Date of Patent: Jan. 24, 2012

(54) METHOD AND APPARATUS FOR SEARCHING BIOMETRIC IMAGE DATA

(75) Inventor: Robert D. Hillhouse, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 0 days.

(21) Appl. No.: 12/771,927

(22) Filed: Apr. 30, 2010

(65) Prior Publication Data

US 2010/0284578 A1 Nov. 11, 2010

Related U.S. Application Data

(62) Division of application No. 10/412,347, filed on Apr. 14, 2003, now Pat. No. 7,711,153.

(51) Int. Cl.
*G06K 9/00* (2006.01)

(52) U.S. Cl. ..................................... 382/124

(58) Field of Classification Search .................. 382/124, 382/126, 127, 313, 314, 315; 340/5.52, 5.53, 340/5.82, 5.83, 356; 358/496, 497, 486; 348/77, 78
See application file for complete search history.

(56) References Cited

U.S. PATENT DOCUMENTS

| 4,817,183 | A | 3/1989 | Sparrow |
| 5,717,777 | A | 2/1998 | Wong et al. |
| 5,901,239 | A | 5/1999 | Kamei |
| 5,926,555 | A | 7/1999 | Ort et al. |
| 6,070,159 | A | 5/2000 | Wilson et al. |
| 6,487,306 | B1 | 11/2002 | Jain et al. |
| 7,120,280 | B2 | 10/2006 | Biswas et al. |
| 2003/0039381 | A1 | 2/2003 | Ziesig |
| 2003/0229514 | A2 | 12/2003 | Brown |
| 2004/0017934 | A1 | 1/2004 | Kocher |

FOREIGN PATENT DOCUMENTS

DE 10004457 A1 8/2001

OTHER PUBLICATIONS

Bebis, George, et al. "Fingerprint Identification Using Delaunay Triangulation." Proc. Intl. Conf. on Information Intelligence and Systems, pp. 452-459, 1999.
Bhanu, B., and Tan, X. "A Triplet Based Approach for Indexing of Fingerprint Database for Identification." Proc. Third Intl. Conf. on Audio- and Video-Based Biometric Person Authentication (Lecture Notes in Computer Science vol. 2091) pp. 205-210, 2001.
Fan et al. "A Fuzzy bipartite weighted graph matching approach to fingerprint verification", System, Man, and Cybernetics, Oct. 1998, pp. 4363-4368 vol. 5.
Germain, R.S., "Large Scale Systems," *Biometrics: Personal Identification in Networks SOC.*, 1999, Kluwer Academic Publishers, pp. 311-325.
Mike Harvey, "Why veins could replace fingerprints and retinas as most secure form of ID", Nov. 11, 2008, http://technology.timesonline.co.uk/tol/news/tech_and_web/article5129384.ece.

*Primary Examiner* — Brian Le
(74) *Attorney, Agent, or Firm* — Perkins Coie LLP

(57) ABSTRACT

A method for matching biometric data is disclosed. A biometric information source is sensed to provide an image thereof. The image is then analysed to extract features therefrom. A feature is selected as a first feature and a plurality of polygons are generated with a location of the first feature as a vertex of each. The polygons are then used to search a lookup table in order to determine an orientation and translation of the image relative to stored reference data.

20 Claims, 9 Drawing Sheets

METHOD AND APPARATUS FOR SEARCHING BIOMETRIC IMAGE DATA

CROSS-REFERENCES TO RELATED APPLICATIONS

This application is a divisional application of commonly assigned U.S. patent application Ser. No. 10/412,347 filed on Apr. 14, 2003, now U.S. Pat. No. 7,711,153, and entitled "METHOD AND APPARATUS FOR SEARCHING BIOMETRIC IMAGE DATA," which is hereby incorporated herein in its entirety by reference. This application is also related to U.S. patent application Ser. No. 11/544,801 filed Oct. 6, 2006, and entitled "METHOD AND APPARATUS FOR SEARCHING BIOMETRIC IMAGE DATA," which is incorporated by reference herein in its entirety.

FIELD OF THE INVENTION

The invention relates generally to searching of biometric image data and more particularly to a method of searching through biometric image templates for a match to sensed biometric image data.

BACKGROUND OF THE INVENTION

Biometric authentication systems are now commonplace. Most biometric imaging systems relate a sensed biometric image and a known biometric template, one to the other. Such a system is referred to as a one-to-one authentication system. Using such a system, a sensed image is generally analysed within a frame of reference common to the frame of reference in which the template was extracted. From the analysed sensed biometric data, feature data is extracted within the known frame of reference. This extracted feature data is then registered against the biometric template.

Another form of biometric authentication system relies on a one-to-many comparison process. In the one to many authentication process, a sensed image is generally analysed within a frame of reference common to the frame of reference in which all of the templates were extracted. From the analysed sensed biometric data, feature data is extracted within the known frame of reference. This extracted feature data is then registered against each of the biometric templates. The most close match is then selected as the "authentication." Unfortunately, in such a system, the registration process is either more computationally expensive resulting in better authentication or of a less computationally expensive nature providing for faster execution.

One method to speed up the process of registration in a one-to-many biometric authentication system involves dividing the biometric templates based on characteristics and then, by identifying the characteristics, only registering the feature data against the biometric templates having similar characteristics. For example, fingerprints are groupable based on the fingerprint type—loop, swirl, etc. Thus, registration of the feature data is only performed against some of the template. Unfortunately, some feature data is difficult to classify resulting in less of an advantage to the above method than might be expected. Further, it is difficult to group fingerprints into small enough groupings due to the general nature of fingerprint classification and difficulties in accurately classifying fingerprints.

Also, the use of a subset of, for example, a fingerprint image as a PIN is difficult. Fingerprints and other biometric information sources are not truly repeatable in nature. A fingertip may be drier or wetter. It may be more elastic or less. It may be scratched or dirty or clean. Each of the above listed conditions affects the fingerprint image and, as such, means that the image subset may very well differ. Typical PIN analysis requires provision of the unique and static PIN. Here, such a method will result in a system that is very inconvenient to use.

It is an object to provide a method of identifying an individual that overcomes the limitations of the prior art.

SUMMARY OF THE INVENTION

In accordance with an aspect of the invention there is provided a method for use in biometric authentication comprising the steps of: a) sensing a biometric information source to provide biometric data; b) determining a plurality of feature locations, the feature locations of features within the biometric data; c) for a first feature location of the plurality of feature locations forming a plurality of at least a line each based on some of the plurality of feature locations including the first feature location; and, d) forming at least a lookup table entry based on characteristics of the plurality of at least a line.

In accordance with the invention there is also provided a method for use in biometric authentication comprising the steps of: a) sensing a biometric information source to provide biometric data; b) determining a plurality of feature locations, the feature locations of features within the biometric data; c) for a first feature location of the plurality of feature locations forming a plurality of at least a line each based on some of the plurality of feature locations including the first feature location; and, d) searching within a lookup table for entries substantially similar to the plurality of at least a line to determine alignment data relating to the biometric data.

In accordance with the invention there is also provided a method for use in biometric authentication comprising the steps of: a) sensing a biometric information source to provide biometric data; b) determining a plurality of feature locations, the feature locations of features within the biometric data; c) for a first feature location of the plurality of feature locations forming a plurality of at least a line each based on some of the plurality of feature locations including the first feature location; and, d) searching within a lookup table for entries substantially similar to the plurality of at least a line to filter a plurality of templates to identify some templates with which alignment of the biometric data is likely.

In accordance with the invention there is also provided a method for use in biometric authentication comprising the steps of: sensing a biometric information source to provide biometric data; determining a plurality of feature locations, the feature locations of features within the biometric data; for a first feature location of the plurality of feature locations forming a plurality of at least a line each based on some of the plurality of feature locations including the first feature location; and, forming at least a lookup table entry based on characteristics of the plurality of at least a line; sensing another biometric information source to provide further biometric data; determining a further plurality of feature locations, the feature locations of features within the further biometric data; for a further first feature location of the further plurality of feature locations forming a further plurality of at least a line each based on some of the further plurality of feature locations including the further first feature location; and, searching within a lookup table for entries substantially similar to the further plurality of at least a line.

In accordance with another aspect of the invention there is provided an authentication database comprising: a lookup table including at least a lookup table entry based on characteristics of a plurality of lines for a first feature location of a plurality of feature locations extracted from a biometric information sample each line based on some of the plurality of feature locations including the first feature location.

In accordance with yet another aspect of the invention there is provided a memory having data stored thereon, the data relating to a plurality of executable instructions for, when executed resulting in performance of the steps of: determining a plurality of feature locations, the feature locations of features within the biometric data; and, for a first feature location of the plurality of feature locations forming a plurality of at least a line each based on some of the plurality of feature locations including the first feature location.

BRIEF DESCRIPTION OF THE DRAWINGS

The invention will now be described with reference to the attached drawings in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. In particular, the invention is described with reference to fingerprints but it is to be completely understood that the invention also works with other forms of biometric information.

Figure 1A:
FIG. 1a is a simplified diagram of a portion of a fingerprint ridge valley pattern.
Figure 1B:
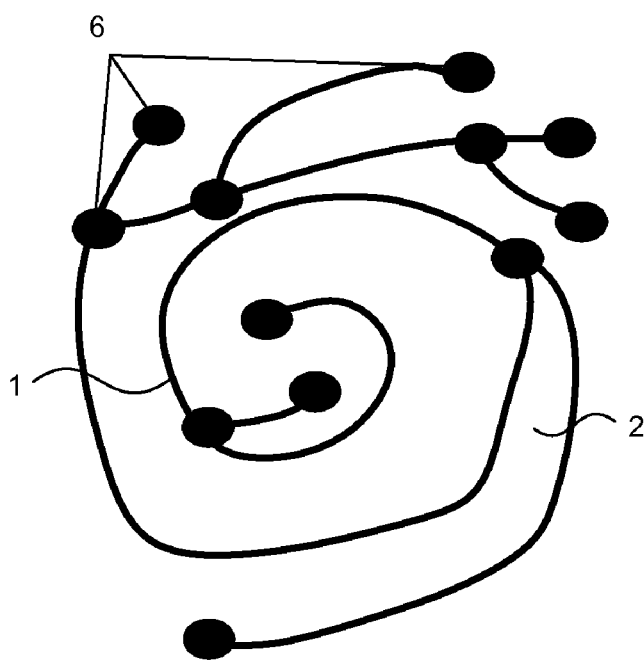
FIG. 1b is a simplified diagram of the portion of a fingerprint ridge valley pattern with features thereof indicated.

Referring to FIG. 1a, a pre-processed simplified portion of a fingerprint about its core is shown. The image is filtered using image processing filtering techniques and the contrast is adjusted to a normalized level. The fingerprint comprises ridges 1 and valleys 2. Alternatively, the image is inverted resulting in ridges 1 being represented in white instead of black. Within the image, features 6 are present as highlighted in FIG. 1b. The features include ridge endings and bifurcations. Of course, other feature types are also known and, in implementing the present invention feature selection from any known features is possible. Preferably, features are selected having accurately identifiable locations.

Figure 2:
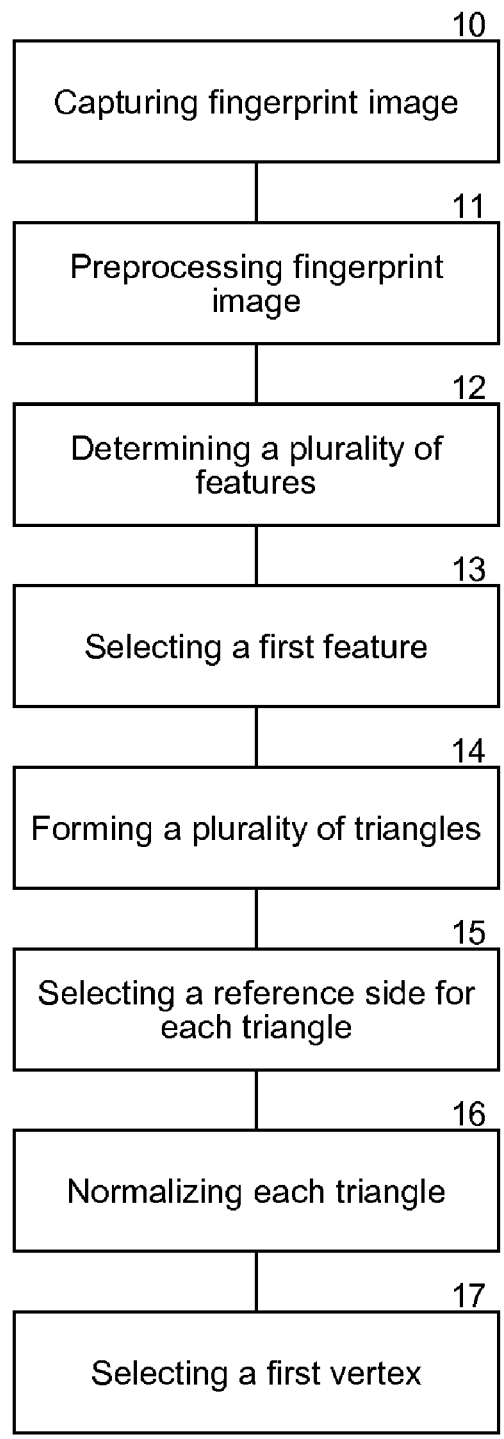
FIG. 2 is a simplified flow diagram of a method according to the invention.
Figure 3:
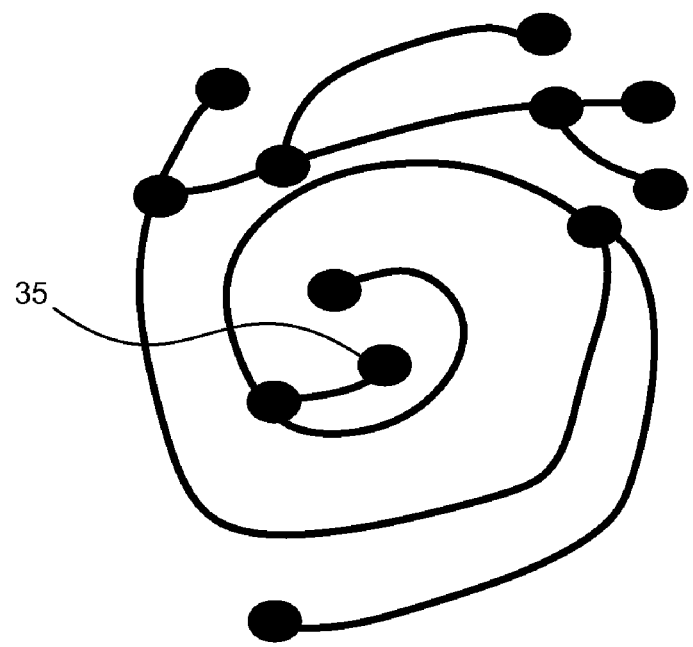
FIG. 3 is a simplified diagram of the portion of a fingerprint ridge valley pattern with features thereof indicated and a first feature indicated.

Referring to FIG. 2, a simplified flow diagram of a method according to the invention is shown. A fingerprint image is captured in step 10. The image is typically of a larger area of a fingertip than that shown in FIG. 1a, but the image of FIG. 1a is provided for explanation of the present embodiment for clarity. The fingerprint image is preprocessed in step 11 resulting in a preprocessed image, a simplified version of which is shown in FIG. 1a. The fingerprint image is then analyzed in step 12 to determine a plurality of features and their locations shown in FIG. 1b. From the plurality of features, a first feature, shown as 35 in FIG. 3, is selected at step 13. The feature location of the first feature is then used in the formation of a plurality of polygons. Hereinbelow, the method is described using a preferred polygon, the triangle, though other polygons are also supported.

Figure 4:
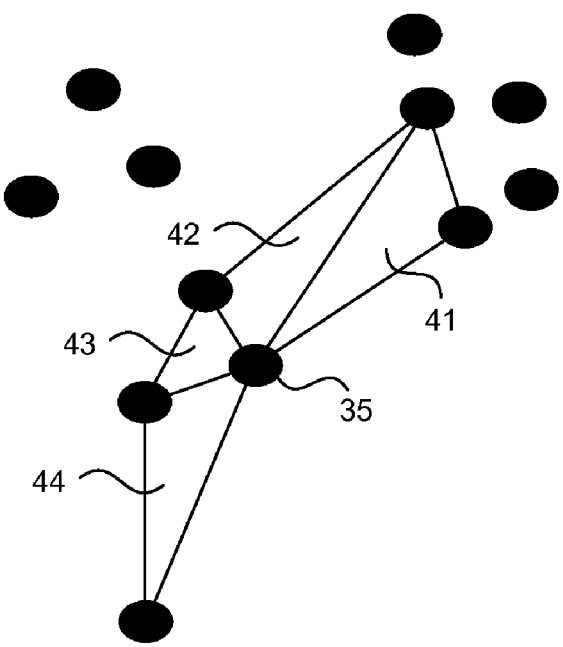
FIG. 4 is a simplified diagram of the portion of a fingerprint ridge valley pattern with features thereof indicated and a first feature indicated and a plurality of polygons in the form of triangles formed with a vertex at the first feature.

In step 14, and shown in FIG. 4, a plurality of triangles are formed having vertices at each of three feature locations one of which is the location of the first feature 35. Though only four triangles are shown for clarity, one of skill in the art will appreciate that many more triangles are typically formed. For example, when all triangles are formed using the six (6) closest features, this results in 6!2 (! Indicating the choose function) triangles or a total of 15 triangles all having the first feature location as a vertex thereof.

Figure 5:
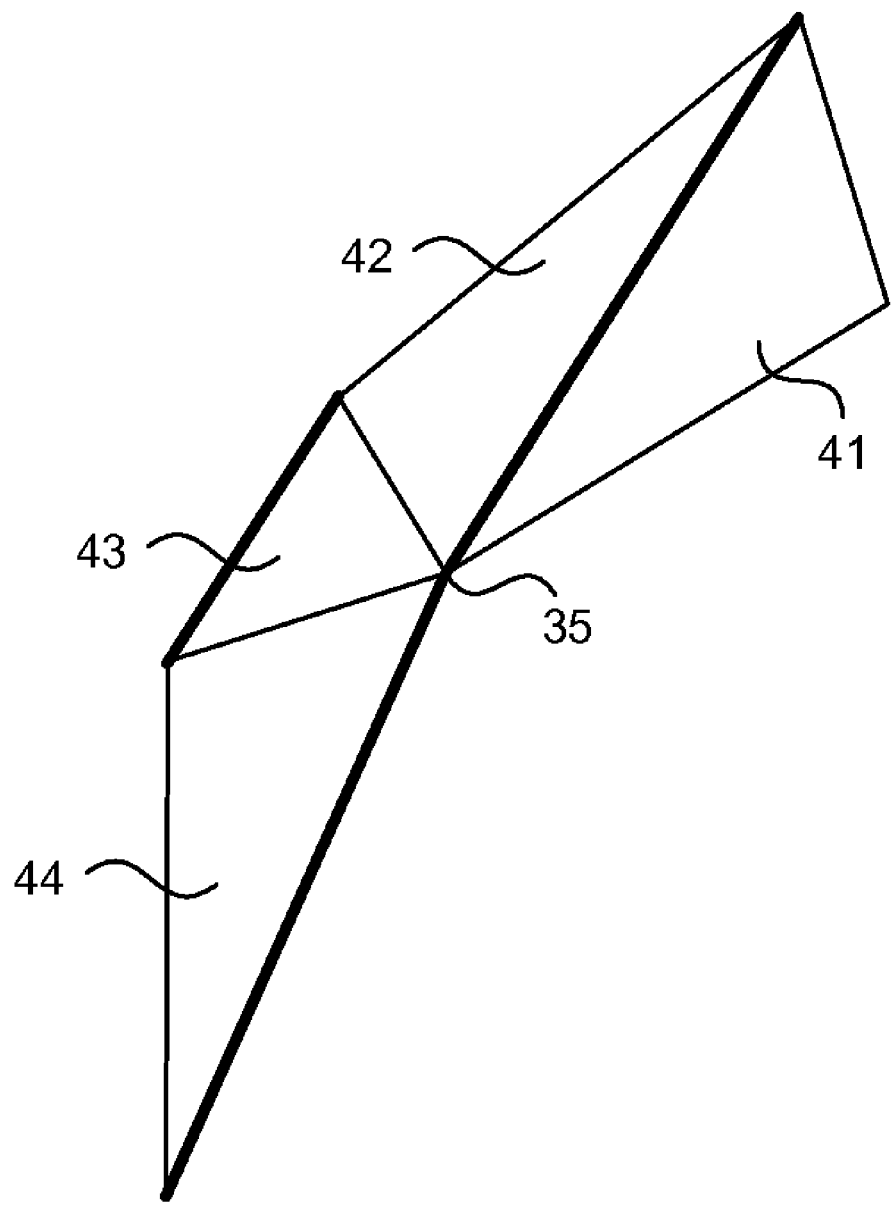
FIG. 5 is a simplified diagram of the portion of a fingerprint ridge valley pattern with features thereof indicated and a first feature indicated and a plurality of polygons in the form of triangles formed with a vertex at the first feature and a longest side of each polygon highlighted.

In step 15, a side of each triangle is selected as the reference side. Here, the longest side of each triangle is selected as the first side as shown in FIG. 5. In step 16, each triangle is normalized with their longest side first and sides presented in a clockwise order, the normalization of polygon representation. This maintains polygon scale while rendering each polygon related data record a unique representation repeatably determinable from a same polygon. When using such a method, scaling of the sensed biometric data is performed prior to polygon extraction.

Alternatively, scale normalization is performed where the side of longest length is represented with a reference value for length thereof. For example, each longest side is set to a maximum length, based on a number of bits used to store a side length. Then the shorter sides are stored as proportions of the longest side. Of course, since all longest sides are stored as a same side length, there is no need to store a length of the longest side. Alternatively, all triangles are normalized relative to a first triangle so relative size of different triangles is maintained. Normalisation is a useful tool as it prevents effects such as scaling caused by use of different biometric sensing apparatus from significantly affecting the present method from functioning adequately.

Figure 6:
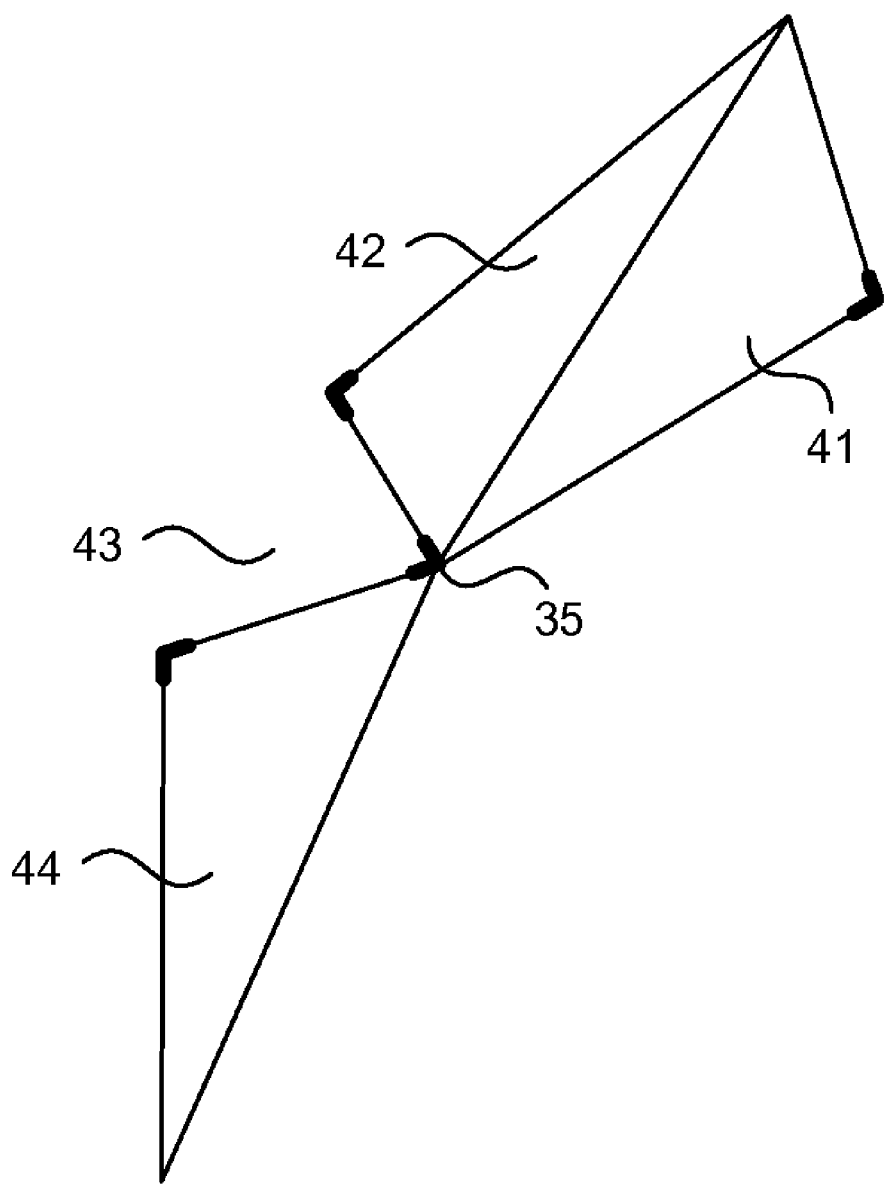
FIG. 6 is a simplified diagram of the portion of a fingerprint ridge valley pattern with features thereof indicated and a first feature indicated and a plurality of polygons in the form of triangles formed with a vertex at the first feature and an angle opposite a longest side of each polygon highlighted.

In step 17, a vertex of each triangle is selected as a first vertex as shown in FIG. 6. In an embodiment, the first vertex is the vertex opposite the first side. By ordering of sides and vertices in a known ordering, the resulting data is in a consistent form for comparison.

Once the triangles are stored as a record, this record forms an indexable and searchable item within a database. Thus, a single record is useful for a one to one biometric image match to form a "quick and dirty" estimation of registrability. That said, when the record is stored in a database with many records, it is possible to search the database in order to reduce a number of registration attempts required to identify an individual using a one-to-many biometric authentication process.

Figure 7A:
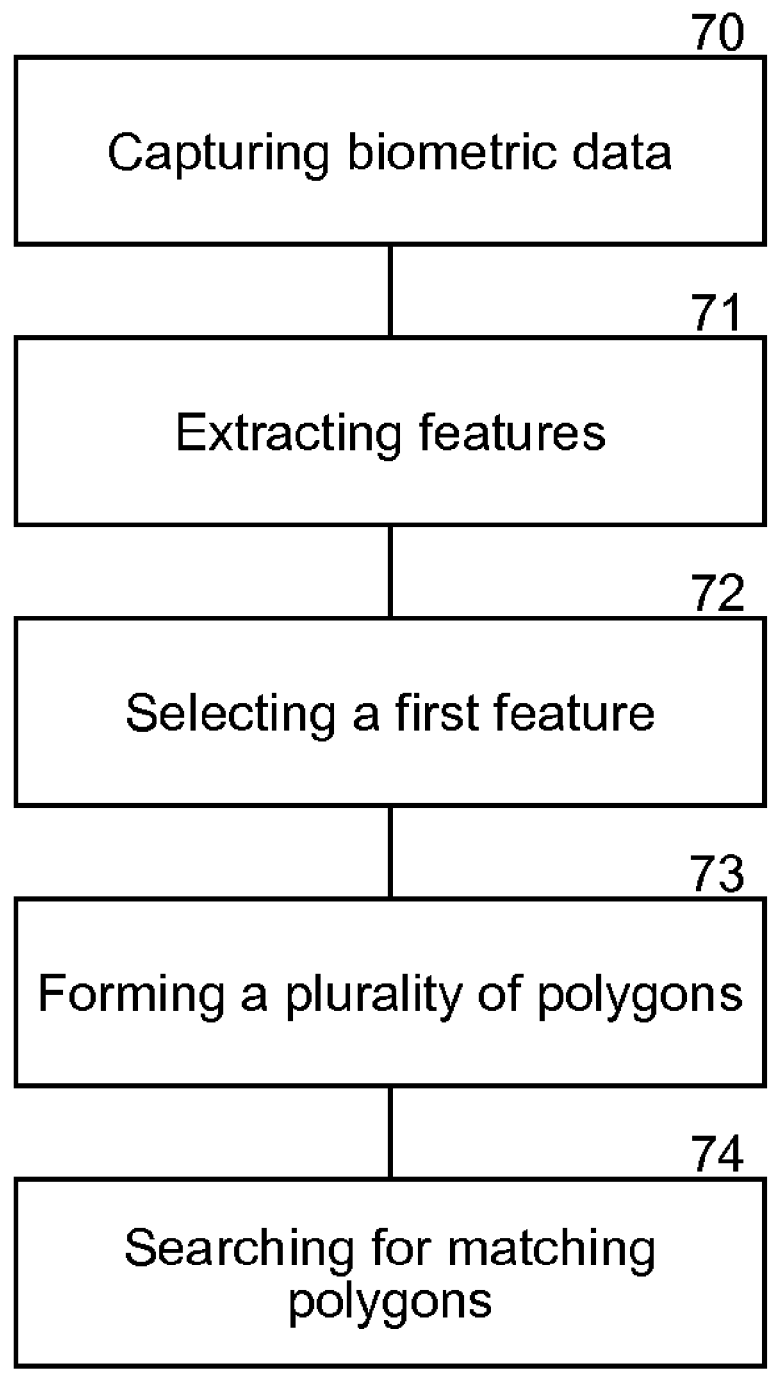
FIG. 7a is a simplified flow diagram of a method of performing a one to one match.

Referring to FIG. 7a, a method of performing a one-to-one match is shown for use in match-on-card applications. Here, as little biometric data as is possible is provided from a secure storage device to a second other processor for use in alignment of sensed biometric data within a known frame of reference. Aligning features of a biometric image from one sample to another sample is a difficult problem even given all the template data. Often the two samples have very little image area of intersection, the images are sometimes rotated relative to each other, sometimes image distortion exists and some features that are present in one image are not present in another image. Determining an optimal alignment in a reasonable amount of processing time is key to being able to reliably match a fingerprint. Of course the optimal alignment must be determined and then produced in the reasonable time so it is important that the determination be made quickly to provide time for translation and rotation of the fingerprint image.

In a Match-On-Card environment, the problem is more complex because the number of features used for alignment is preferably kept to a minimum. For example, only the minutia locations are provided and, optionally, these are transformed for enhanced security. The transformation of the minutia locations introduces further error between samples and makes the problems associated with alignment more significant. Some images have so many false minutia points that an attempt to manually perform an alignment is unlikely to succeed.

According to the invention, biometric data is captures at step 70, features are extracted therefrom, step 71, each having a feature location. At step 72, a feature is selected as the first feature. A plurality of polygons is formed, step 73, based on the feature locations. The polygons are used to search for matching polygons, step 74, in order to align the images. The method is useful with any feature and with numerous polygons; however, for the purposes of explanation, fingerprint minutia locations are used with triangular polygons.

In processing of a reference fingerprint, for each feature location (X,Y) the nearest N features are found. All combinations of 2 features are chosen from the N features and N!2 triangles are formed using the sets of 2 features. The triangles are stored in a normalized form and stored in a O(1) lookup table. Features about the triangle that are useful are, for example, the length of each side, the type of feature present at each vertex, the orientation of each feature at each vertex, and the value of each feature at each vertex. Of course, angles between sides are also useful though a triangle is clearly defined by lengths of three sides and their relative ordering—lengths alone defining two triangles exhibiting mirror symmetry. Alternatively, any feature data desired for storage within the triangle data is possible. When authentication is implemented on more than one processor in a distributed fashion, security concerns may limit available features for use in alignment.

A person of skill in the art will quickly understand that the above method generates multiple copies of a same triangle when more than one feature location (Xi,Yi) are used. This might result in unreasonable weighting of some features relative to others in an alignment process since more than one match will occur when the duplicate triangle is present in the live fingerprint sample. Therefore, in an embodiment triangles are stored only once and the O(1) lookup table allows for a quick lookup to determine if a triangle has already been stored and prevent multiple entries of the same triangle. Alternatively, in another embodiment triangles are stored several times, but during alignment each triangle is only compared to one matching entry using a filter in the alignment process instead of in the lookup table construction process.

Further alternatively, a graph is maintained for each translation-rotation pairing. As each polygon is matched, its rotation and translation is determined and a graph associated with the rotation and the translation is updated.

Once the lookup table is produced, a plurality of triangles is known and their orientation and position in a known frame of reference is also known. Thus, determining an orientation and position of similar triangles in a live fingerprint sample, allows for alignment of the live fingerprint sample within the known frame of reference.

Using a live fingerprint sample, a similar process is performed to extract triangles; however, each triangle generated is matched against all similar triangles within the lookup table. The O(1) lookup table facilitates this lookup without resulting in a significant performance degradation. Each triangle matched is stored in a bipartite graph as a possible matching of features. The weight of the match in the bipartite graph indicates a similarity between the two triangles.

Once a reasonable match is formed, alignment is known and the resulting live fingerprint data is comparable to the template fingerprint data in the known frame of reference. For example, the live fingerprint data is translated and rotated such that the triangles that match overlay one on another. Here, the live fingerprint data is extracted within the known frame of reference and provided to a secure processor for comparison against secure template data. Of course, since the triangles for single first feature 35 are all connected at that feature, the alignment is performable with reasonable accuracy.

Figure 7B:
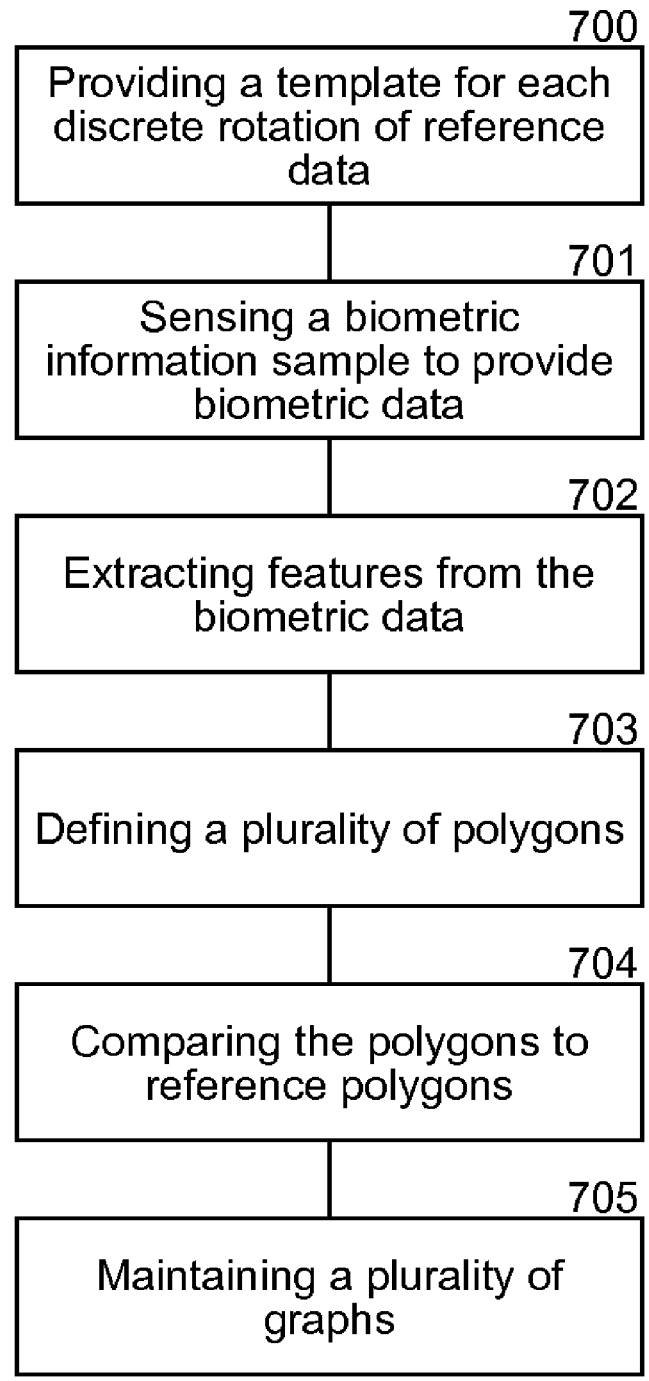
FIG. 7b is a simplified flow diagram of a method of performing a one to one match.

Alternatively, as shown in FIG. 7b, multiple bipartite graphs are used to determine a rotation of the live fingerprint data. A template is provided for each discrete rotation of the reference data, step 700. A biometric information sample is sensed to provide biometric data, 701. The biometric data is analysed to extract features therefrom, step 702, each feature having a feature location. A plurality of polygons is defined based on the feature locations, step 703. The polygons are compared to reference polygons in a lookup table, step 704, and a plurality of graphs are maintained—one relating to each template—step 705. The triangles are matched in an other than rotationally independent fashion. The following property of matching triangles is noteworthy: Matching triangles will all have a similar rotation, but non-matching similar triangles will have rotations that are distributed among each possible rotation at random. Using a separate bipartite graph for each rotation removes a lot of noise from the bipartite graph that corresponds to the correct rotation.

Further alternatively, multiple bipartite graphs are used to determine a translation of the live fingerprint data. A graph is provided for each discrete translation of the live data and a graph is maintained relating to each template. The triangles are matched in an other than translationally independent fashion. =Using a separate bipartite graph for each translation removes a lot of noise from the bipartite graph that corresponds to the correct translation.

The bipartite graph with the strongest weightings is chosen. At this point the correct rotation is known. To determine the rest of the transformation required to align the reference sample with the live sample, the translation is also needed. The mode of the translations is chosen for both the X and Y coordinates. The image is then translated and compared against the template associated with its rotation. Alternatively, a rotation amount is determined and the image is transformed in orientation according to the determined rotation.

Alternatively translation is determined using the triangle matching method first and rotation is determined based on the results of the first step. Further alternatively, a template is stored for each of a plurality of rotations and the alignment is either performed by selecting a template with a matching rotation or by rotating to a most appropriate template. For example, if templates are provided at 1 degree rotations for 180 degrees, the live fingerprint image is either provided as is or is rotated 180 degrees—a relatively computationally simple transformation.

Figure 8:
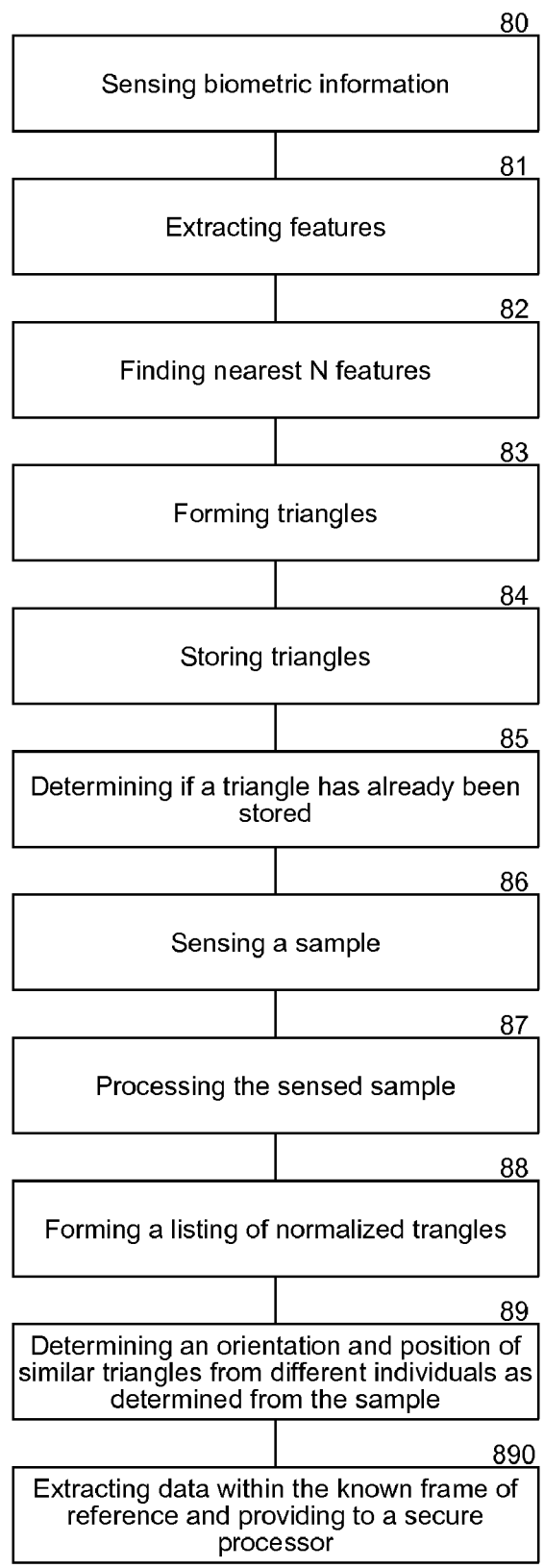
FIG. 8 is a simplified flow diagram of a method of performing a one to many match; and, FIG. 9 is a simplified flow diagram of a method of performing a one to many match from a plurality of templates of a same biometric information source is shown.

Referring to FIG. 8, a method of performing a one-to-many match is shown. Here, as little biometric data as is possible is provided from a secure storage device in the form of a secure server to second other processor for use in alignment of sensed biometric data within a known frame of reference. Aligning features of a biometric image from one sample to another sample remains a difficult problem. Further, a good alignment method will also act as a filter eliminating many potential identifications prior to template registration. Of course, when the entire process is performed on a same secure server, then all the template data is usable in performing alignment allowing for more accurate filtering in most cases.

In a one-to-many environment, template registration on fewer templates is advantageous as it improves overall system security and reliability. When an authentication server is used, it is advantageous to maintain a number of features used for alignment at a minimum number to reduce network traffic. Of course alignment data is provided from the authentication server for every fingerprint within the template database. Alternatively, the alignment data is public and is stored on each workstation on the network. According to the invention, the problem is once again solved using a polygon method. The method is useful with any feature; however, for the purposes of explanation, fingerprint minutia locations are used with triangular polygons.

A biometric information source in the form of a fingertip is sensed to provide a fingerprint at step 80. The fingerprint is analysed to extract features having feature locations therefrom at step 81. In processing of a reference fingerprint to form a template, for a number of feature locations (X,Y) the nearest N features are found, step 82. All combinations of 2 features are chosen from the N features and N!2 triangles are formed using the sets of 2 features, step 83. It has been found that a value of N around 12 is useful as the number of triangles is not so large and yet a reasonable number of triangles is formed. N is preferably chosen to overcome problems of false features present in the reference fingerprint sample. The triangles are stored in a normalized form and stored in a O(1) lookup table, step 84. Features about the triangle that are useful are, for example, the length of each side, the type of feature present at each vertex, the orientation of each feature at each vertex, and the value of each feature at each vertex. Of course, angles between sides are also useful though a triangle is clearly defined by lengths of three sides and their relative ordering—lengths alone defining two triangles exhibiting mirror symmetry.

A person of skill in the art will quickly understand that the above method generates multiple copies of a same triangle when more than one feature location (Xi,Yi) are used. This might result in unreasonable weighting of some features relative to others in an alignment process. Therefore, triangles are stored only once and the O(1) lookup table allows for a quick lookup to determine if a triangle has already been stored and prevent multiple entries of the same triangle, step 85. Alternatively, triangles are stored several times, but during alignment each triangle is only compared to one matching entry using a filter in the alignment process instead of in the lookup table construction process.

Preferably, the live fingerprint sample is sensed, step 86, and processed in a similar fashion, step 87, forming a listing of normalized polygons in the form of triangles that is filtered to remove duplicates, step 88. This allows for each polygon to maintain a same weighting in appropriate graphs as it is only represented once in each list.

Once the lookup table is produced, a plurality of triangles is known and their orientation and position in a known frame of reference is also known. Thus, a step of determining an orientation and position of similar triangles determined from the live fingerprint sample is performed, step 89, allowing for alignment of the live fingerprint sample within the known frame of reference. Failure to determine an orientation and position of similar triangles in the live fingerprint is indicative of a poor match and template registration for that fingerprint template is obviated.

Using a live fingerprint sample, a similar process is performed to extract triangles; however, each triangle generated is matched against all similar triangles within the lookup table. The O(1) lookup table facilitates this lookup without resulting in a significant performance degradation. Each triangle matched is stored in a bipartite graph as a possible matching of features. The weight of the match in the bipartite graph indicates a similarity between the two triangles. There is a bipartite graph for each template such that only aligned templates are then registered against the live fingerprint data to determine a likelihood of a match. Because the image alignment is performable with statistically valid reliability, those triangles relating to templates and for which no match is found—alignment with whose template does not occur—act as filters to limit a number of template registrations required.

Once a list of reasonable matches is formed, alignment is known for comparisons with each of the templates within the list and the resulting live fingerprint data is comparable to each of the template fingerprint data within each said known frame of reference. For example, the live fingerprint data is translated and rotated such that the triangles that match overlay one on another one template at a time. Here, the live fingerprint data is extracted within the known frame of reference and provided to a secure processor for comparison against the associated template data, step 890.

The lookup table functions adequately with multiple fingerprints without loss of speed. In effect, an O(1) lookup can be performed against 100 fingerprints instead of just one print. This means that this idea will work with a limited one-to-many. However, as more prints are added to the lookup table, more memory is needed and the amount of noise within the table also increases. Distributed processing of the lookup operations on numerous processors is useful in alleviating the memory requirements for some implementations.

Figure 9:
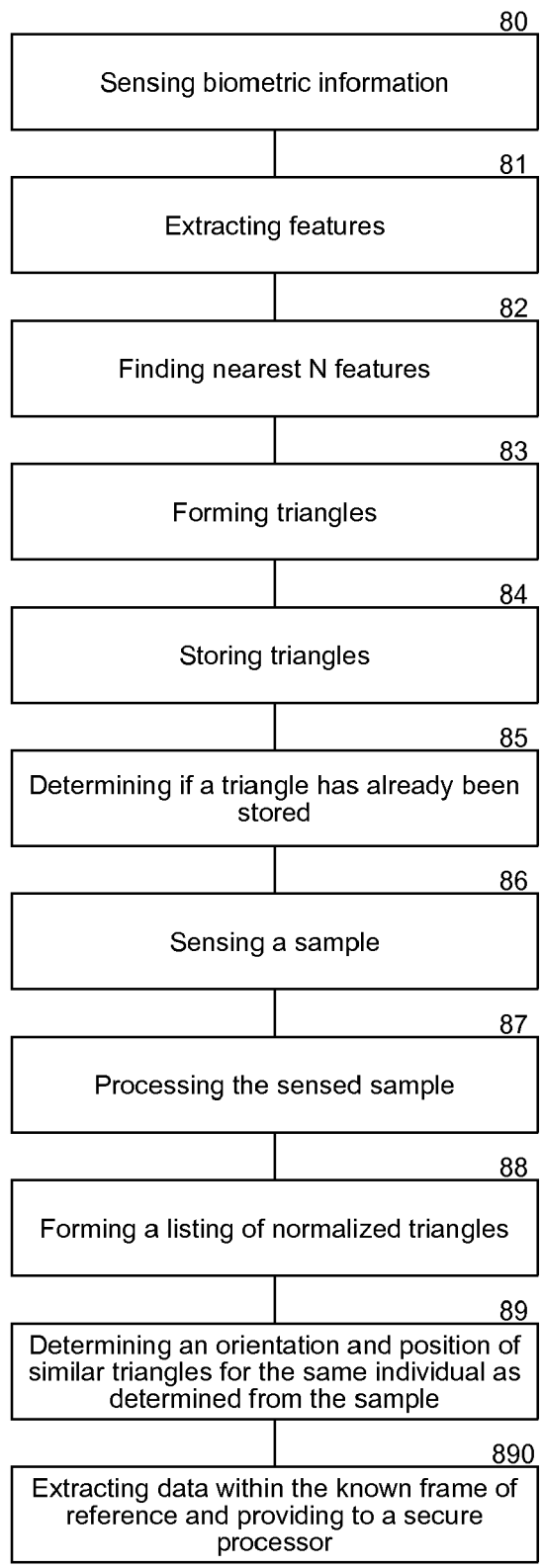

Referring to FIG. 9, a method of selecting templates from a plurality of templates of a same biometric information source is shown. This method is identical to the one to many application set out with reference to FIG. 8, but here the "many" templates all relate to biometrics of a same individual. For example, to authenticate someone using any one of their ten fingerprints requires that a system distinguish adequately between each of the individual's fingerprints. The present method facilitates discrimination between fingerprints for such an application.

As will be evident to those of skill in the art, normalization and sorting or indexing of lookup table entries allows for fast efficient searching of the lookup table.

The present inventive method is implementable in a distributed processing environment since each of several processors may be provided different lookup tables and feature locations from the live fingerprint data to determine potential matches. For very large sets of features and large one-to-many systems, this is advantageous as distributed processing will improve overall system performance in those cases.

Often, it is desired to compare the live sample against multiple reference samples. A user may have multiple fingers enrolled, or there may be multiple users that need to be checked. It is preferable to use an O(1) lookup such that aligning against 100 reference samples doesn't take any longer than aligning against one sample.

In accordance with an experimental implementation, the lookup table was O(1) and was indexed first by the length of the perimeter and secondly by the length of each side. Alternatively, the lookup table is indexed by feature type and then by a ratio of lengths of sides. Further alternatively, the lookup table is indexed based on the angles between each pair of sides of each polygon. In another embodiment, indexing is performed based on minutia directions relative to side angles. In yet another embodiment, indexing is performed based on minutia directions relative to each other in a predetermined ordering.

Preferably, only features within a certain neighborhood of the first feature are relied upon or those features within the certain neighbourhood are weighted more heavily in the graphs. This reduces or eliminates error due to skewing and stretching of the biometric sample and also allows an alignment to occur even when the overlap region is small. Of course, longer lines are typically more prone to error but the errors are likely small relative to the line length. Further, longer lines result in better rotational values for a rotational offset as they are less susceptible to quantization error resulting from a resolution of the sensing apparatus.

Preferably, for each feature, multiple other features of the fingerprint are grouped therewith forming polygons. This reduces or eliminates alignment problems due to missing and/or false features.

Many situations where limited one-to-many matching systems are in use including free-seating systems where multiple people are sharing multiple computers. It is possible to distribute each matching attempt across all the systems and use the spare computation power of some or all of the systems to align a sensed live fingerprint against each reference template. In effect, this allows a limited one-to-many and significantly reduces the noise that is introduced by attempting to align a live sample against a large number of multiple reference templates.

Though the invention is described with reference to triangular polygons, it is understood by one of skill in the art that a polygon is definable without fully specifying all parameters thereof. For example, a triangle is defined by a two side lengths and an angle or by a side length and the two angles at each end thereof and their orientation relative to the line or by three side lengths and an order thereof.

In another embodiment, a plurality of feature locations is used to uniquely define shapes other than polygons. For example, three feature locations are used to define an ellipse having values of a and b related to distances from the first feature location to each of the other two features and having a position thereof related to one or more of the feature locations. Thus, as long as the shape definition is approximately unique to the placement of the feature locations, alignment data is determinable from the shapes as is searchability. For the ellipse presented in the previous example, indexing is performable on a and b, for example.

In yet another embodiment, instead of shapes being defined based on feature locations, lines are defined. This provides for a very simple process defining a line between every feature and the first feature. Since a line is only dependent on two points, it is not necessary to limit the area over which lines are formed. Errors in line alignment and absent features, become identifiable in a more straightforward manner since there is not an issue of which of the vertices caused the polygon to not be found. Further, lines provide excellent rotational and translational information. Effectively, for a single first point, a graph so formed is representative of a pattern emanating from the first point to each feature within an image—a series of lines emanating from a same point. Though this is not a plurality of polygons or shapes, the resulting pattern is searchable as a plurality of line elements reducing the effects of absent features or distortion within one or both images.

Of course, using lines also enhances processing time since the lines do not require normalization, are easily sorted by length, and are easily identifiable.

Using lines is highly advantageous in many applications and more specifically when other feature data such as feature type and direction is known. Thus a line becomes more than just a distance between points. It is a distance between points having known and easily identifiable qualities. As such, accurate correlation between lines is facilitated.

Numerous other embodiments may be envisaged without departing from the spirit and scope of the invention.

What is claimed is:

1. A method that is performed by a computer for biometric authentication, the method comprising:

receiving reference biometric data;

determining a plurality of feature locations, wherein the feature locations correspond to features within the reference biometric data;

for at least a selected one of the feature locations of the plurality of feature locations— dividing, with the computer, the plurality of feature locations other than the selected one of the feature locations into a first portion of the plurality of feature locations and a second portion of the plurality of feature locations, wherein a number of feature locations included in the first portion is greater than two and is less than a number of feature locations other than the selected one of the feature location included in the plurality of feature locations, and each feature location included in the first portion is positioned closer to the selected one of the feature locations than each feature location included in the second portion is positioned to the selected one of the feature locations; and forming, with the computer, a plurality of polygons, wherein each of the polygons comprises the selected one of the feature locations and a predetermined number of feature locations from the first portion, and each vertex of each of the polygons is at the selected one of the feature locations or is at one of the predetermined number of feature locations from the first portion, wherein a number of polygons formed corresponds to a maximum number of mutually different polygons which are formed to comprise the selected one of the feature locations and the predetermined number of feature locations from the first portion; and forming, with the computer, a plurality of lookup table entries, wherein each lookup table entry is formed based on characteristics associated with a corresponding one of the plurality of polygons.

2. The method of claim 1, further comprising removing duplicate polygons.

3. The method of claim 1 wherein forming a plurality of polygons comprises forming polygons having lines with two end-points.

4. The method of claim 1 wherein forming a plurality of lookup table entries includes forming lookup table entries based on a length associated with a corresponding one of the plurality of polygons.

5. The method of claim 1 wherein forming a plurality of lookup table entries includes forming lookup table entries that are ordered.

6. The method of claim 1 wherein forming a plurality of lookup table entries includes forming lookup table entries that are indexed.

7. The method of claim 1 wherein forming a plurality of lookup table entries includes forming triangles.

8. The method of claim 1, further comprising normalizing the polygons.

9. The method of claim 8 further comprising ordering the lookup table entries based upon the normalized polygons.

10. The method of claim 8 further comprising indexing the lookup table based upon the normalized polygons.

11. An article of manufacture including a non-transitory computer-readable medium having instructions stored thereon that, if executed by a computing device, cause the computing device to perform operations comprising:
  determining multiple feature locations, wherein the feature locations correspond to features within biometric data;
  for at least a selected one of the feature locations of the multiple feature locations—
    dividing the multiple feature locations other than the selected one of the feature locations into a first portion of the multiple feature locations and a second portion of the multiple feature locations, wherein a number of feature locations included in the first portion is greater than two and is less than a number of feature locations other than the selected one of the feature location included in the multiple feature locations, and each feature location included in the first portion is positioned closer to the selected one of the feature locations than each feature location included in the second portion is positioned to the selected one of the feature locations; and
    forming multiple polygons, wherein each of the polygons comprises the selected one of the feature locations and a predetermined number of feature locations from the first portion, and each vertex of each of the polygons is at the selected one of the feature locations or is at one of the predetermined number of feature locations from the first portion, wherein a number of polygons formed corresponds to a maximum number of mutually different polygons which are formed to comprise the selected one of the feature locations and the predetermined number of feature locations from the first portion; and
    forming multiple lookup table entries, wherein each lookup table entry is formed based on characteristics associated with a corresponding one of the multiple polygons.

12. The article of manufacture of claim 11 wherein the operations further comprise receiving the biometric data.

13. The article of manufacture of claim 11 wherein the operations further comprise removing duplicate polygons.

14. The article of manufacture of claim 11 wherein the operations further comprise normalizing the polygons.

15. The article of manufacture of claim 14 wherein the lookup table entries are ordered based upon the normalized polygons.

16. The article of manufacture of claim 14 wherein the lookup table is indexed based upon the normalized polygons.

17. A computer comprising:
  a processor;
  a memory; and
  a component configured to—
    determine multiple feature locations, wherein the feature locations correspond to features within biometric data; and
    for at least a selected one of the feature locations of the multiple feature locations—
      divide the multiple feature locations other than the selected one of the feature locations into a first portion of the multiple feature locations and a second portion of the multiple feature locations, wherein a number of feature locations included in the first portion is greater than two and is less than a number of feature locations other than the selected one of the feature location included in the multiple feature locations, and each feature location included in the first portion is positioned closer to the selected one of the feature locations than each feature location included in the second portion is positioned to the selected one of the feature locations; and
      form multiple polygons, wherein each of the polygons comprises the selected one of the feature locations and a predetermined number of feature locations from the first portion, and each vertex of each of the polygons is at the selected one of the feature locations or is at one of the predetermined number of feature locations from the first portion, wherein a number of polygons formed corresponds to a maximum number of mutually different polygons which are formed to comprise the selected one of the feature locations and the predetermined number of feature locations from the first portion; and
    generate multiple data structure entries, wherein each data structure entry is generated based on characteristics associated with a corresponding one of the multiple polygons.

18. The computer of claim 17 wherein the component is further configured to receive the biometric data.

19. The computer of claim 17 wherein the component is further configured to remove duplicate polygons.

20. The computer of claim 17 wherein the component is further configured to normalize the polygons.

* * * * *